United States Patent
Park et al.

(10) Patent No.: US 10,071,685 B2
(45) Date of Patent: Sep. 11, 2018

(54) AUDIO VIDEO NAVIGATION (AVN) HEAD UNIT, VEHICLE HAVING THE SAME, AND METHOD FOR CONTROLLING THE VEHICLE HAVING THE AVN HEAD UNIT

(71) Applicants: HYUNDAI MOTOR COMPANY, Seoul (KR); KIA MOTORS CORPORATION, Seoul (KR)

(72) Inventors: Dae Sun Park, Incheon (KR); Unhwan Sol, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/602,935

(22) Filed: May 23, 2017

(65) Prior Publication Data

US 2018/0170253 A1   Jun. 21, 2018

(30) Foreign Application Priority Data

Dec. 21, 2016   (KR) .................. 10-2016-0175367

(51) Int. Cl.
| | | |
|---|---|---|
| *B60Q 1/14* | (2006.01) | |
| *B60Q 3/80* | (2017.01) | |
| *B60Q 3/72* | (2017.01) | |

(52) U.S. Cl.
CPC .................. *B60Q 3/80* (2017.02); *B60Q 3/72* (2017.02)

(58) Field of Classification Search
None
See application file for complete search history.

(56) References Cited

U.S. PATENT DOCUMENTS

| | | | |
|---|---|---|---|
| 2005/0192724 A1 | 9/2005 | Hendry | |
| 2013/0018567 A1 | 1/2013 | Lim et al. | |
| 2015/0165967 A1* | 6/2015 | Lee | G09G 3/3406 315/77 |
| 2016/0257198 A1* | 9/2016 | Buttolo | B60K 35/00 |

FOREIGN PATENT DOCUMENTS

| | | |
|---|---|---|
| JP | 2014098652 A | 5/2014 |
| JP | 2014162449 A | 9/2014 |
| KR | 10-2012-0020444 A | 3/2012 |
| KR | 10-2016-0104411 A | 9/2016 |

* cited by examiner

*Primary Examiner* — Anh Tran
(74) *Attorney, Agent, or Firm* — Brinks, Gilson & Lione

(57) ABSTRACT

The present disclosure provides a head unit, a vehicle including the same, and a method for controlling the vehicle having the head unit. The head unit includes: a controller configured to control an in-vehicle device contained in a vehicle by interacting with manipulation of a user device, where the controller is configured to: receive information from the user device; control the in-vehicle device based on the information; and perform a command for operating the in-vehicle device based on signal sensitivity of the information and a predetermined logic.

9 Claims, 6 Drawing Sheets

ND NAVIGATION (AVN) HEAD
AUDIO VIDEO NAVIGATION (AVN) HEAD UNIT, VEHICLE HAVING THE SAME, AND METHOD FOR CONTROLLING THE VEHICLE HAVING THE AVN HEAD UNIT

CROSS-REFERENCE TO RELATED APPLICATION

The present application claims priority to and the benefit of Korean Patent Application No. 10-2016-0175367, filed on Dec. 21, 2016, which is incorporated herein by reference in its entirety.

FIELD

The present disclosure relates to a head unit for controlling in-vehicle devices by interacting with manipulation of an external device, a vehicle having the same, and a method for controlling the vehicle having the head unit.

BACKGROUND

The statements in this section merely provide background information related to the present disclosure and may not constitute prior art.

A vehicle can perform basic traveling functions and additional functions for user convenience, for example, an audio function, a video function, a navigation function, an air-conditioning control function, a seat control function, an illumination control function, etc.

In order to perform the above-mentioned functions, an audio device, a video device, and a navigation device are integrated into a vehicle multimedia system implemented as a single system, for example, an audio video navigation (AVN) head unit. The AVN head unit is embedded in the vehicle. The AVN head unit may provide a radio service for reproducing a radio program on the basis of terrestrial radio signals, an audio service for reproducing a Compact Disc (CD) and the like, a video service for reproducing a digital versatile disc (DVD) and the like, and a navigation service for providing a navigation function.

Recently, with the increasing development of vehicle Information Technology (IT), many developers and companies are conducting intensive research into vehicle pairing technology for controlling the AVN head unit to provide various services by interacting with an external device. As representative examples of such services, the vehicle pairing technology provides a hands-free function, a music playback function, a video playback function, etc. by Bluetooth communicating with the external device such as a smartphone.

However, when a driver who rides in the vehicle manipulates the external device, user convenience may occur. For example, when an iris recognition function or a camera from among various functions of the external device is used, the vehicle driver must switch on the light because illuminance of the indoor space of the vehicle is dark, resulting in greater inconvenience of use.

In addition, when the driver desires to acquire weather information using the external device, the vehicle is not controlled according to the recognized weather information although it is expected that rain will fall or a large amount of fine dust occurs. As a result, the vehicle staying in a state of an opened window or opened sunroof may unavoidably travel on the road.

SUMMARY

It is an aspect of the present disclosure to provide a head unit for automatically controlling in-vehicle devices when the external device paired with a vehicle is manipulated, a vehicle including the same, and a method for controlling the vehicle equipped with the head unit.

Additional aspects of the disclosure will be set forth in part in the description which follows and, in part, will be obvious from the description, or may be learned by practice of the disclosure.

In accordance with an aspect of the present disclosure, a head unit includes: a controller configured to control an in-vehicle device contained in a vehicle by interacting with manipulation of a user device, wherein the controller is configured to receive information from the user device, to control the in-vehicle device, and to perform a command for operating the in-vehicle device using signal sensitivity of the information and a predetermined logic.

The controller may determine a position of the user device based on the signal sensitivity of the information.

The controller may receive a lighting-ON signal from the user device, and may determine the position of the user device based on communication sensitivity of the lighting-ON signal.

If the communication sensitivity of the lighting-ON signal is equal to or higher than a predetermined reference value, the controller may determine that the user device is located at a front seat.

If the communication sensitivity of the lighting-ON signal is equal to or less than the predetermined reference value, the controller may determine that the user device is located at a rear seat.

The controller may control a front-seat lighting or a rear-seat lighting according to the position of the user device.

Upon receiving a lighting-OFF signal from the user device, the controller may determine that a lighting is switched on by the lighting-ON signal, and may control an OFF operation of the lighting according to the determined result.

If one or more user devices are present, the controller may determine whether a lighting is switched on by another user device regardless of whether the lighting-ON signal is received from any one of the user devices, and may control operation of the lighting according to the determined result.

Only when the lighting is not switched on by another user device, the controller may determine communication sensitivity of the lighting-ON signal, determines the position of any one of the user devices, and may control operation of the lighting according to the determined position of any one of the user devices.

The controller may receive weather information from the user device, and may thus control the in-vehicle device.

In accordance with another aspect of the present disclosure, a method for controlling a vehicle using a head unit configured to control an in-vehicle device contained in a vehicle by interacting with manipulation of a user device includes: receiving a lighting-ON signal from the user device; determining the position of the user device based on communication sensitivity of the lighting-ON signal; and controlling an ON operation of a lighting according to a position of the user device.

The method may further include: receiving a lighting-OFF signal from the user device; determining whether the lighting is switched on by the lighting-ON signal; and if the lighting is switched on by the lighting-ON signal, controlling an OFF operation of the lighting.

In accordance with another aspect of the present disclosure, a method for controlling a vehicle using a head unit connected to one or more user devices, where the head unit is configured to control an in-vehicle device contained in a vehicle includes: receiving a lighting-ON signal from any one of the user devices; determining whether the lighting is switched on by another user device from among the user devices; and when the lighting is not switched on by the other user device, controlling an ON operation of the lighting according to the received lighting-ON signal.

The method may further include: receiving a lighting-OFF signal from the any one of the user devices; determining whether the lighting is switched on by the other user device from among the user devices; if the lighting is not switched on by the other user device, determining whether the lighting is switched on by the lighting-ON signal; and if the lighting is switched on by the lighting-ON signal, controlling an OFF operation of the lighting.

The method may further include: determining the position of the any one of the user devices by recognizing communication sensitivity of the lighting-ON/OFF signal; and controlling an ON/OFF operation of the lighting according to the position of the any one of the user devices.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
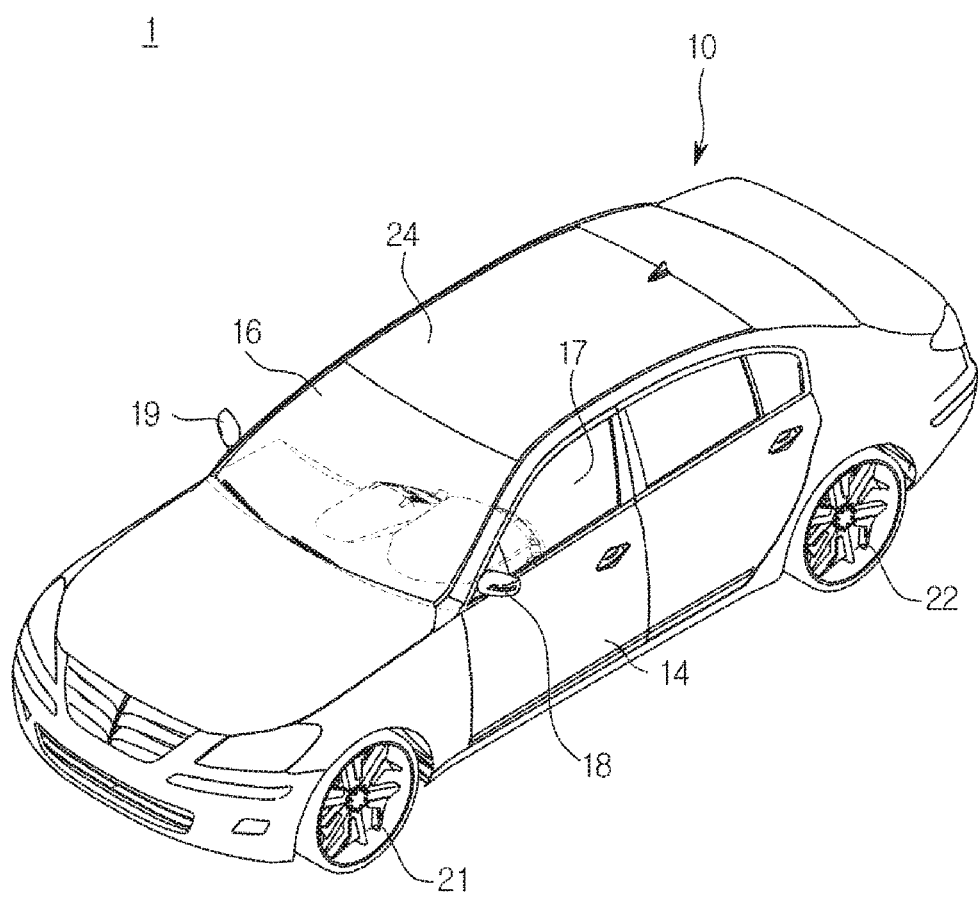
FIG. 1 is a view illustrating the appearance of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that the throughout the drawings, corresponding reference numerals indicate like or corresponding parts and features.

FIG. 1 is a view illustrating the appearance of a vehicle according to one form of the present disclosure.

Referring to FIG. 1, the vehicle 1 includes a body 10 forming the appearance of the vehicle 1, and vehicle wheels 21 and 22 to move the vehicle 1 from place to place. The exterior part of the body 10 may include doors 14 to shield an indoor space of the vehicle 1 from the outside, a front window (also referred to as a windshield) 16 to provide a forward view of the vehicle 1 to a vehicle driver who rides in the vehicle 1, side windows (hereinafter referred to as windows) 17 to provide a side view of the vehicle 1, and side-view mirrors 18 and 19 mounted to the doors 14 so that the driver who rides in the vehicle 1 can obtain visual information of the lateral and rear directions of the vehicle 1.

In addition, a sunroof 24 to implement ventilation, a sense of openness, or well-lighting in the inner space of the vehicle 1 may be mounted to the top of the body 10.

Besides, the vehicle 1 may include a variety of sensing devices, for example, a proximity sensor to detect the presence of obstacles located at the lateral and rear directions of the vehicle 1, a rain sensor to detect the presence or absence of rainfall and the amount of rainfall, etc.

For example, the proximity sensor emits a sensing signal to a lateral direction or a backward direction of the vehicle, and receives a signal reflected from obstacles such as other vehicles. In addition, the proximity sensor may detect the presence or absence of an obstacle located at the rear of the vehicle 1 on the basis of a waveform of the received reflection signal, and may recognize the position of obstacle. The proximity sensor may emit ultrasonic waves, and may detect the distance to the obstacle using the ultrasonic waves reflected from the obstacle.

Figure 2:
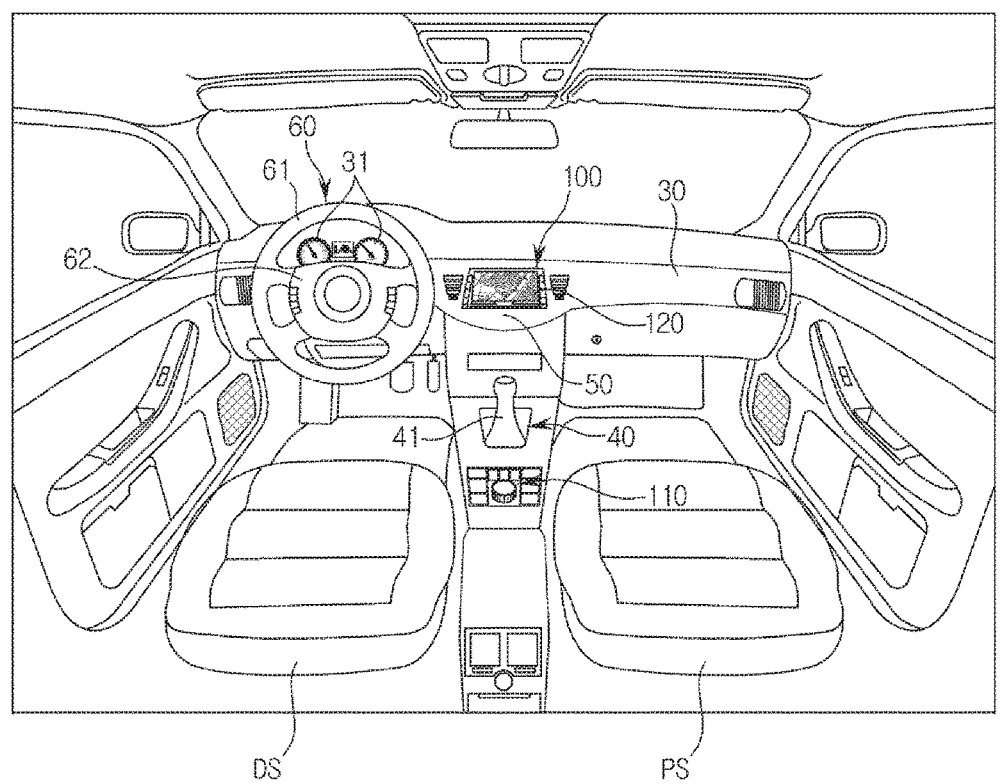
FIG. 2 is a view illustrating the internal structure of the vehicle.

FIG. 2 is a view illustrating the internal structure of the vehicle according to one form of the present disclosure.

Referring to FIG. 2, the vehicle may have seats DS and PS on which a passenger is seated, a dashboard 30 to operate various operations of the vehicle 1 as well as to include various instrument panels displaying operational information of the vehicle 1, and a steering wheel to steer the vehicle 1.

The seats may include a driver seat DS for a driver, a passenger seat PS for a fellow passenger, and a rear seat arranged in the rear of the vehicle 1.

The dashboard 30 may include an instrument panel 31 (including a speedometer, a fuel gauge, an automatic transmission shift indicator, a tachometer, and a mileage indicator, which are arranged on the dashboard 30 to output information related to driving), a gearbox 40, a center console (also called a center fascia) 50, etc.

A gearshift 41 for vehicle gear-shifting may be installed at the gearbox 40. In addition, as can be seen from FIG. 2, an input unit 110 for allowing a user to control the AVN head unit 100 or the principal functions of the vehicle 1 may be installed at the gearbox 40.

The center console 50 may include an air-conditioner, a clock, the AVN head unit 100, etc. The air-conditioner 50 can maintain temperature, humidity, purity, and airflow of indoor air of the vehicle 1 under comfortable or pleasant conditions. The air-conditioner 50 may be installed at the center console 50, and may include at least one air outlet through which air is discharged to the outside. A button or dial for controlling the air-conditioner 50 may be installed at the center console 50. A user such as a vehicle driver may control the air-conditioner 50 of the vehicle 1 using the button or dial mounted to the center console 50.

The AVN head unit 100 (also referred to as a vehicle multimedia device) in which an audio/video (AV) device and a navigation device embedded in the vehicle 1 are integrated into one system is designed. The AVN head unit 100 may provide a radio service for reproducing a radio program on the basis of terrestrial radio signals, an audio service for reproducing a Compact Disc (CD) and the like, a video service for reproducing a digital versatile disc (DVD) and the like, a navigation service for providing a navigation function, and a phone service for controlling information as to whether a mobile phone connected to the vehicle 1 receives a phone call from another party. In addition, the AVN head unit 100 may also provide a voice recognition service upon receiving a voice signal instead of a user manipulation signal, and the voice recognition service may provide a radio service, an audio service, a video service, a navigation service, and a phone call service.

The AVN head unit 100 may be installed at the top of the dashboard 30, and may be embedded in the center console 50. In this case, only a touchscreen part 120 for displaying a touchscreen image from among constituent elements of the AVN head unit 100 may be exposed to the outside.

The user may receive the radio service, the audio service, the video service, and the navigation service through the AVN head unit 100.

In this case, the AVN head unit 100 may be referred to as a navigation terminal, and may also be referred to by various terms well known to those skilled in the art as necessary.

In addition, the AVN head unit 100 may be connected to user devices (i.e., user equipments UEs), for example, a Portable Multimedia Player (PMP), an MPEG Audio Layer-3 (MP3) player, a Personal Digital Assistants (PDA), etc. through Wireless Fidelity (Wi-Fi) or Bluetooth pairing, and may reproduce audio and video files as necessary.

The steering wheel 60 is a device that adjusts a traveling direction of the vehicle, is connected to a rim 61 grasped by a vehicle driver and a steering device of the vehicle, and includes a spoke 62 to connect the rim 61 to a hub of a rotation axis for steering. In accordance with one form of the present disclosure, the spoke 62 may include various devices embedded in the vehicle 1, for example, manipulation devices for controlling the AVN device 51, etc.

The AVN head unit 100 may selectively display at least one of a radio screen image, an audio screen image, a video screen image, a navigation screen image, and a phone screen image through the touchscreen part 120. In addition, the AVN head unit 100 may display various control screen images associated with control of the vehicle 1, may also display screen images associated with additional functions capable of being executed in the AVN head unit 100.

In accordance with one form of the present disclosure, the AVN head unit 100 interoperable with the above air-conditioner may display various control screen images associated with the air-conditioner control through the touchscreen part 120. In addition, the AVN head unit 100 may adjust the air-conditioning environment of the vehicle 1 by controlling the operation state of the air-conditioner. In addition, the AVN head unit 100 may display a map including a route to a destination on the touchscreen part 120 for recognition of the vehicle driver, and a detailed description thereof will hereinafter be given.

The touchscreen part 120 may be implemented by any one of a Liquid Crystal Display (LCD) panel, a Light Emitting Diode (LED) panel, an Organic Light Emitting Diode (OLED) panel, etc., without being limited thereto. The touchscreen part 120 may perform a screen display function and an input function of instructions or commands.

The touchscreen part 120 may output a screen image including predetermined images to the outside according to an operating system (OS) for driving/controlling the AVN head unit 100 and an application being executed in the AVN head unit 100, or may receive instructions or commands.

The touchscreen part 120 may display a basic screen image according to the executed application. If touch manipulation is not performed, the touchscreen part 120 may display the basic screen image.

The touchscreen part 120 may also display a touch manipulation screen image according to situations. The touch manipulation screen may indicate a screen image capable of receiving the user's touch manipulation.

The touchscreen part 120 may be any one of a resistive touchscreen which senses the user's touch manipulation by recognizing pressure, a capacitive touchscreen which senses the user's touch manipulation based on the effect of capacitive coupling, an optical touchscreen based on infrared light, or an ultrasonic touchscreen which uses ultrasound, without being limited thereto.

The touchscreen part 120 may control the AVN head unit 100 embedded in the vehicle 1 to interact with the user, and may receive a user command through touch interaction or the like. Since characters or menus displayed on the touchscreen part 120 are selected, the touchscreen part 120 may receive a user command as an input.

Figure 3:
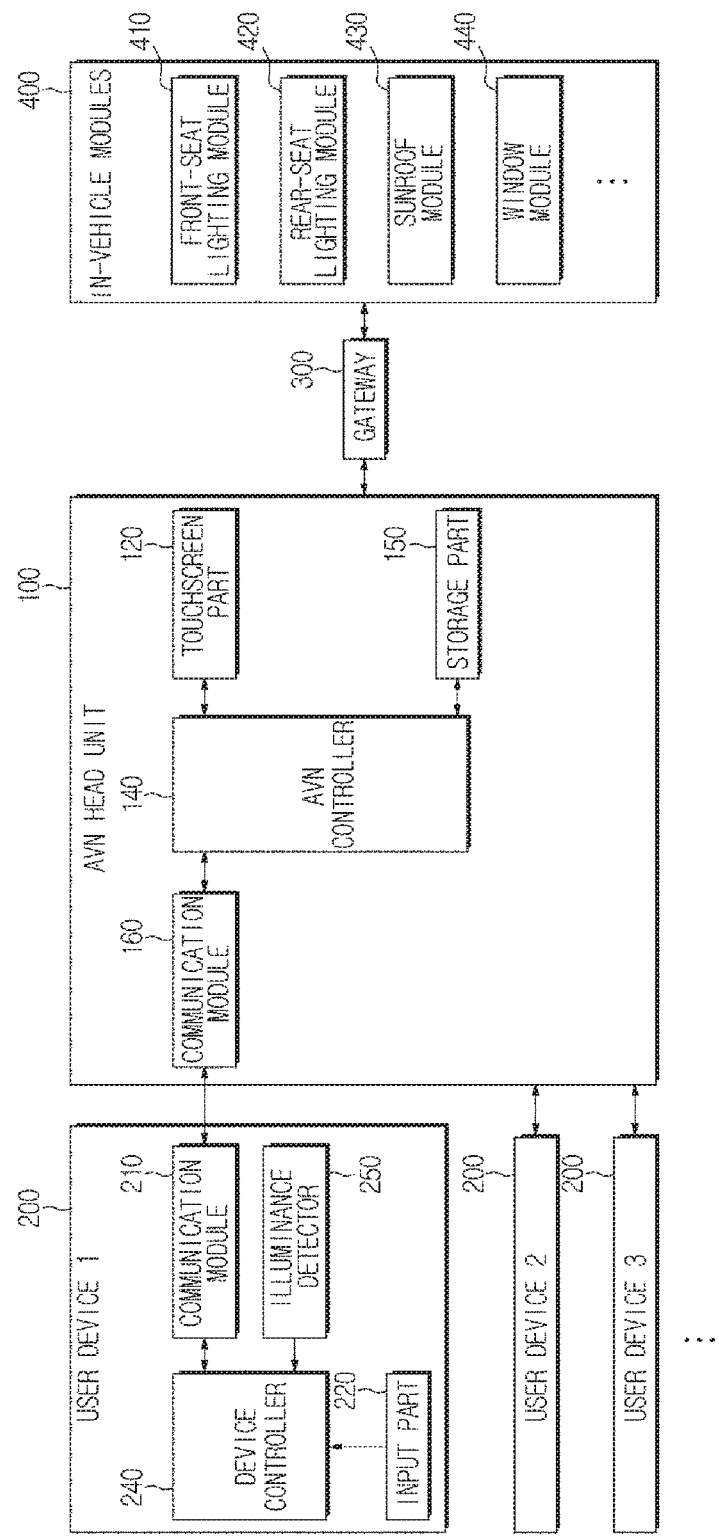
FIG. 3 is a block diagram illustrating a user device and an AVN head unit.

FIG. 3 is a block diagram illustrating a user device and an AVN head unit according to a form of the present disclosure.

In FIG. 3, the AVN head unit 100 may be paired with the user device 200 through Wi-Fi or Bluetooth communication, such that the AVN head unit 100 and the user device 200 may communicate with each other. One or more user devices 200 (user device 1, user device 2, user device 3 . . . ) may be connected to the AVN head unit 100.

The AVN head unit 100 may be paired with the user device 200 to support a connectivity function {Carplay(CP)/Android Auto(AA)/MirrorLink(ML)}, and may communicate with the user device 200 such that the AVN head unit 100 can transmit and receive various data (phone call, music, map, etc.) to and from the user device 200 and can perform data processing.

In addition, the AVN head unit 200 may include a Universal Serial Bus (USB) port, and the like, may be connected to multimedia portable devices, for example, a Personal Digital Assistants (PDA), a Portable Multimedia Player (PMP), an MPEG Audio Layer-3 (MP3) player, etc., and may reproduce audio and video files as necessary.

As described above, as the number of utilization times of the user device 200 increases, the AVN head unit 100 may be paired with the user device 200 so that the AVN head unit 100 may display a connectivity function of the user device 200 on the touchscreen part 120.

In addition, the AVN head unit 100 may communicate not only with the user device 100 but also with the server, and may also communicate with other kinds of storage devices as necessary.

In addition, the AVN head unit 100 may control various kinds of in-vehicle modules 400 through a gateway 300. As representative examples of the in-vehicle modules 400, the AVN head unit 100 may control a front-seat lighting module 410, a rear-seat lighting module 420, a window module 430, a sunroof module 440, an air-conditioner, etc. embedded in the vehicle 1.

In order to control in-vehicle modules 410, 420, 430 and 440 as well as to implement communication among the in-vehicle modules 410, 420, 430 and 440, a communication network including a body network, a multimedia network, a chassis network, etc. may be constructed in the vehicle 1. The respective networks separated from each other may communicate with each other through the gateway 300 such that controller area network (CAN) communication messages can be communicated among the above-mentioned networks.

The user device 200 according to some forms of the present disclosure may be a user equipment (UE) paired with the AVN head unit 100. For example, the user device (or UE) 200 may include a mobile phone (e.g., a cellular phone or a PCS phone), a smart phone, a personal digital assistant (PDA), a Portable Multimedia Player (PMP), a laptop computer, a digital broadcasting terminal, a netbook, a navigation system, a slate PC, a tablet PC, etc. Besides, the user device 200 may also include Internet based multimedia devices.

The user device 200 may communicate with the AVN head unit 100 using applications or programs, such that various kinds of data can be communicated between the user device 200 and the AVN head unit 100. Of course, the user device 200 may include a music application, a video application, an equalizer application, etc. contained in a conventional user device 200 as necessary.

The user device 200 may perform the iris recognition function or the camera function, and may further include a function for recognizing weather information.

The AVN head unit 100 may control in-vehicle devices 400 upon receiving a pairing command from the user device 200. For example, the AVN head unit 100 may control the front-seat lighting module 410, the rear-seat lighting module 420, the window module 430, the sunroof module 440, the air conditioner, etc.

In order to control in-vehicle modules 410, 420, 430 and 440 as well as to implement communication among the in-vehicle modules 410, 420, 430 and 440, a communication network including a body network, a multimedia network, a chassis network, etc. may be constructed in the vehicle 1. The respective networks separated from each other may communicate with each other through the gateway 300 such that controller area network (CAN) communication messages can be communicated among the above-mentioned networks.

In FIG. 3, the AVN head unit 100 may include the touchscreen part 120, the AVN controller 140, the storage module 150, and the communication module 160.

The touchscreen part 120 may include a touchscreen panel (TSP) configured to receive a control command from the user as well as to display operation information corresponding to the received control command.

The touch screen panel (TSP) may include a display for displaying operation information and user-input control commands, a touch panel for detecting coordinates contacting some parts of a user's body, and a touchscreen controller for determining the user-input control command on the basis of the contact coordinates detected by the TSP.

The touchscreen controller may compare user-touched coordinates detected through the touch panel with control command coordinates displayed through the touchscreen part 120, such that it can recognize the user-input control command.

The touchscreen part 120 may detect touch interaction applied to the touch panel, and may generate and output electrical signals on the basis of the detected touch interaction. The touch interaction may be carried out by a touch means, for example, the user's finger or hand, a touch pen (stylus), etc. Therefore, the touchscreen part 120 may receive instructions or commands from the user. In this case, the touchscreen part 120 may output the screen image to the outside or may not output the screen image to the outside.

The touchscreen part 120 may display images, pictures, and index items, may display operational information needed for the navigation function related to map and road environment information for navigation, may display DMB broadcast images, may display music information from the audio device, and may also display search images for Internet search. In this case, the index item may denote a set of characters or letters. The characters marked on the index items may include symbols, numbers, special characters, etc.

The characters indicating the index items may be Korean (Hangeul) (consonants, vowels), English, Japanese, etc.

In addition, the touchscreen part 120 may display a connectivity function of the user device 20 paired with the AVN head unit 100, and may include a display module acting as a display of the user device 200 according to application control of the user device 200.

The AVN controller 140 may be a microprocessor for controlling overall operation of the AVN head unit 100, and may control various modules and devices embedded in the AVN head unit 100. In accordance with some forms of the present disclosure, the AVN controller 140 may operate by the processor embedded in the AVN head unit 100, may generate control signals for controlling various modules and devices embedded in the AVN head unit 100, and may control the above-mentioned constituent elements using the control signals.

The AVN controller 140 may output music or images in response to a control command of the user device 200 paired with the AVN head unit 100, and may control the modules (i.e., in-vehicle modules) embedded in the vehicle 1 using information of the user device 200 during manipulation of the user device 200.

The AVN controller 140 may perform a command needed for operating the in-vehicle modules using signal intensity of information received from the user device, a decision logic, etc. That is, the AVN controller 140 may recognize signal reception sensitivity of the user device 200 paired with the AVN head unit 100 so as to determine the position of the user device 200, and may control the front-seat lighting and the rear-seat lighting according to the position of the user device 200.

If the front-seat lighting and the rear-seat lighting have already been manipulated, the AVN controller 140 may store the manipulation result and may determine which one of the front-seat lighting and the rear-seat lighting will be adjusted through an operational logic.

The AVN controller 140 may display a screen image related to the user device 200 connected to the AVN head unit 100 on the touchscreen 120 through Wi-Fi, USB, or Bluetooth communication.

The storage module 150 may store various kinds of data needed for operating the AVN head unit 100. That is, the storage module 150 may store various applications needed for providing Operation System (OS) or information needed to drive the interface.

In more detail, the storage module 150 may store a control program for controlling the AVN head unit 100, control data for controlling operations of the AVN head unit 100, a map database (DB) including map data and road data, and destination information related to a user-input destination.

In this case, the map data may be a map for providing a navigation service to the user, and the road data may be road-related information contained in the map so as to provide the navigation service to the user.

Road data may include road information needed for vehicle traveling and navigation, for example, the position of a road, the length of a road, speed limit of a road, etc. In addition, the road contained in the map may be divided into a plurality of road sections on the basis of distance information or information regarding crossing or non-crossing with other roads, and the road data may include road information for each road section.

The destination information may be associated with a destination obtained when the user searches for a route through the AVN head unit 100. The destination information may include a search date at which a user searches for the destination, a destination name, a destination address, longitude and latitude of the destination, etc.

Besides, the storage module 150 may also store operation data generated when the AVN head unit 100 performs a predetermined operation.

The storage module 150 may be configured as at least one of a flash memory type, a hard disk type, a card type memory (e.g. a Secure Digital (SD) memory or an eXtreme Digital (XD) memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disc, an optical disc, etc.

The communication module 160 may be a module to support data communication with the user device 200, and may be paired with the user device 200 and thus receive a connectivity function of the user device 200.

The communication module 160 may include a Wireless Fidelity (Wi-Fi) communication module for connecting to a local area network (LAN) through an access point (AP) or the like; a USB communication module; a Bluetooth communication module to communicate with a single external device on a one-to-one basis or to communicate with a small number of external devices on a one-to-multiple basis; a broadcast signal reception module to receive a digital broadcast signal; and a position information reception module to receive position information of the vehicle 1 from a satellite or the like.

In addition, the communication module 160 may also be connected to other devices using any one of GSM/3GPP-based schemes (GSM, HSDPA, LTE Advanced, etc.), 3GPP2-based schemes (such as CDMA), or WiMAX-based communication schemes.

The communication module 160 may transmit or receive current position information of the vehicle 1 to or from a Global Positioning System (GPS) satellite by communicating with the GPS satellite, or may transmit or receive map information from a server located at a remote site.

In addition, the communication module 160 may be connected to other devices such that it can transmit or receive multimedia data. In more detail, the communication module 160 is connected to a mobile terminal located in the vicinity of the vehicle 1 or to the server located at a remote site, such that it can transmit multimedia data from the mobile terminal or the server. For example, the communication module 160 may be connected to the user device 200, such that it can receive multimedia data stored in the user device 200.

In FIG. 3, the user device 200 may further include a communication module 210, an input part 220, a device controller 240, and an illuminance detector 260.

The communication module 210 may be a module to support data communication with the AVN head unit 100. A detailed description of the communication module 210 is identical to the communication module 160 of the AVN head unit 100, and as such a detailed description thereof will herein be omitted.

The input module 220 may be needed when functions of the user device 200 are input through user manipulation, and may be implemented through a microphone or touch input.

For example, the input part 220 may input a pairing command for performing the iris recognition or camera function in the user device 200 to the device controller 240.

The input part 220 may input the pairing command for recognizing weather information in the user device 200 to the device controller 240.

The device controller 240 may be a microprocessor for controlling overall operation of the user device 200, and may control various modules and devices embedded in the user device 200. In accordance with some forms of the present disclosure, the device controller 240 may operate by the processor embedded in the user device 200, may generate control signals for controlling various modules and devices embedded in the user device 200, and may control the above-mentioned constituent elements using the control signals.

Upon receiving the pairing command through the input part 210, the device controller 240 may request an operation command for controlling the in-vehicle devices 1 from the AVN head unit 100.

That is, if illuminance of the indoor space of the vehicle 1 is dark when iris recognition or camera function is executed by the user device 200, the device controller 240 may transmit a request for switching on the lighting of the vehicle 1 to the AVN head unit 100.

If it is expected that rain will fall or a large amount of fine dust occurs when the weather application is executed by the user device 200, the device controller 240 may request the AVN head unit 100 to close the windows 17 or sunroof 24 of the vehicle 1.

The illuminance detector 250 may detect illuminance of the inner space of the vehicle 1 configured to manipulate the user device 200, and may output the detected illuminance to the device controller 240.

The operations and effects of the head unit, the vehicle having the same, and the method for controlling the vehicle equipped with the head unit according to some forms of the present disclosure will hereinafter be described.

A method for controlling the lighting of the vehicle 1 using the AVN head unit 100 when the iris recognition or camera function is performed by the user device 200 will hereinafter be described with reference to FIG. 4.

Figure 4:
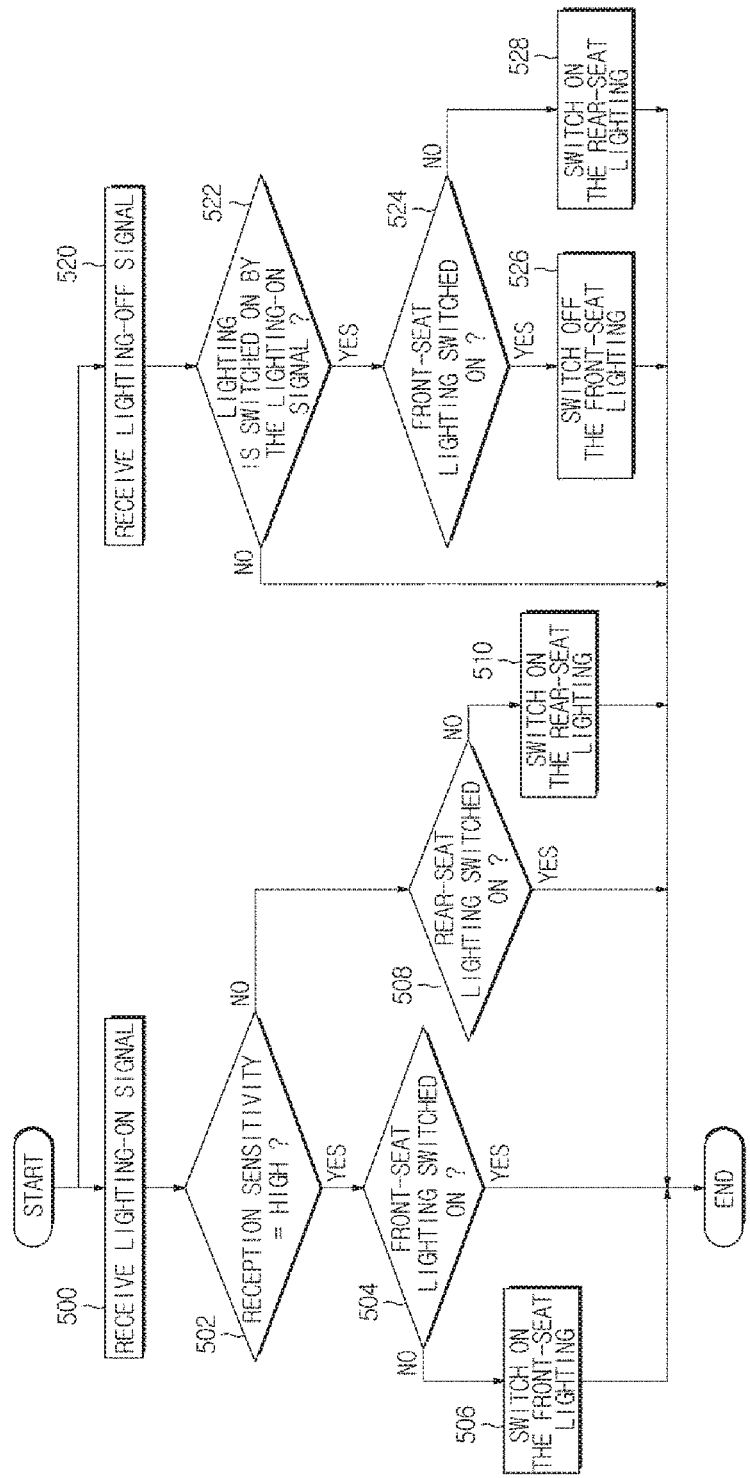
FIG. 4 is a flowchart illustrating an algorithm for controlling the AVN head unit to control lights of the vehicle by interacting with the user device.

FIG. 4 is a flowchart illustrating an algorithm for controlling the AVN head unit to control lights of the vehicle by interacting with the user device according to one form of the present disclosure.

Referring to FIG. 4, the user may execute the iris recognition or camera function using the user device 200.

If the iris recognition or camera function is performed by the user device 200, the device controller 240 may detect brightness or illuminance of the indoor space of the vehicle 1 using the illuminance detector 250, and may determine whether the detected brightness or illuminance is sufficient for the iris recognition or camera function.

If illuminance of the indoor space of the vehicle 1 is low (dark) and it is difficult to perform the iris recognition or camera function, the device controller 240 may transmit a lighting-ON signal for increasing illuminance of the lighting of the vehicle 1 to the AVN head unit 100 of the vehicle 1. In this case, the lighting-ON signal applied to the AVN head unit 100 may be transmitted to the AVN head unit 100 through short range communication such as Wi-Fi or Bluetooth.

Upon receiving the lighting-ON signal from the user device 200 (Operation 500), the AVN head unit 100 may detect a communication sensitivity of the received lighting-ON signal, and may determine whether the detected reception sensitivity is equal to a predetermined reference value or higher (Operation 502).

If the reception sensitivity is strong (Operation 502), the AVN head unit 100 may determine that the user device 100 is located at the front seat, and may determine whether the front-seat lighting (i.e., front-seat room lamp) is switched on (Operation 504).

If the front-seat lighting is switched on (Operation 504), the AVN head unit 100 may determine that the lighting needed for the iris recognition or camera function has already been switched on, and may finish operation without controlling the device (i.e., front-seat lighting) embedded in the vehicle 1.

Meanwhile, assuming that the front-seat lighting is not switched on (Operation 504), the AVN head unit 100 may control the front-seat lighting module 410 so as to switch on the lighting for the iris recognition or camera execution, and may switch on the front-seat lighting acting as one of the in-vehicle devices (Operation 506).

If the reception sensitivity is equal to or less than a predetermined reference value (Operation 502), the AVN head unit 100 may determine that the user device 100 is located at the rear seat, and may determine whether the rear-seat lighting (i.e., rear-seat indoor lighting) is switched on (Operation 508).

If the rear-seat lighting is switched on (Operation 508), it is determined that the lighting needed for the iris recognition or camera function has already been switched on, such that the AVN head unit 100 may finish operation without controlling the in-vehicle device (i.e., the rear-seat lighting).

In the meantime, if the rear-seat lighting is switched off (Operation 508), the AVN head unit 100 may control the rear-seat lighting module 420 to switch on the lighting needed to perform the iris recognition or camera function, such that the AVN head unit 100 may switch on the rear-seat lighting acting as one of the in-vehicle devices (Operation 510).

Subsequently, upon receiving the lighting-OFF signal from the user device 200 (Operation 520), the AVN head unit 100 may determine whether the front-seat lighting or the rear-seat lighting is switched on by the lighting-ON signal received from the user device 200 (Operation 522). As a result, in order to prevent the front-seat lighting or the rear-seat lighting from being automatically switched on when the user manually switches on the front-seat lighting or the rear-seat lighting during execution of the lighting-ON operation, the AVN head unit 100 may determine whether the lighting is switched on by the lighting-ON signal.

If the lighting is switched on by the lighting-ON signal (Operation 522), the AVN head unit 100 may determine that the front-seat lighting or the rear-seat lighting is manually switched on by the user, the AVN head unit 100 may stop operation without controlling the in-vehicle devices (e.g., the front-seat lighting or the rear-seat lighting).

If the lighting is switched on by the lighting-ON signal (Operation 522), the AVN head unit 100 may determine that the front-seat lighting or the rear-seat lighting is automatically switched on and may determine that the front-seat lighting is switched on (Operation 524).

If the front-seat lighting is switched on (Operation 524), the AVN head unit 100 may switch off the front-seat lighting by controlling the front-seat lighting module 410 (Operation 526).

If the front-seat lighting is not switched on (Operation 524), the AVN head unit 100 may determine that the rear-seat lighting is switched on, and may switch off the rear-seat lighting by controlling the rear-seat lighting module 420 (Operation 528).

As described above, the AVN head unit 100 may receive the lighting ON/OFF signal of the vehicle 1 from the user device 200, and may automatically switch on or off the lighting device of the vehicle 1, such that the AVN head unit 100 may automatically control the in-vehicle devices by interacting with manipulation of the user device 200.

Although FIG. 4 has exemplarily disclosed a method for automatically controlling the in-vehicle lighting under the condition that a single user device 200 is connected to the AVN head unit 100 for convenience of description and better understanding of the present disclosure, the scope or spirit of the present disclosure is not limited thereto, and the AVN head unit 100 may automatically control the in-vehicle lighting even when one or more user devices 200 are connected to the AVN head unit 100. A detailed description thereof will hereinafter be given with reference to FIG. 5.

Figure 5:
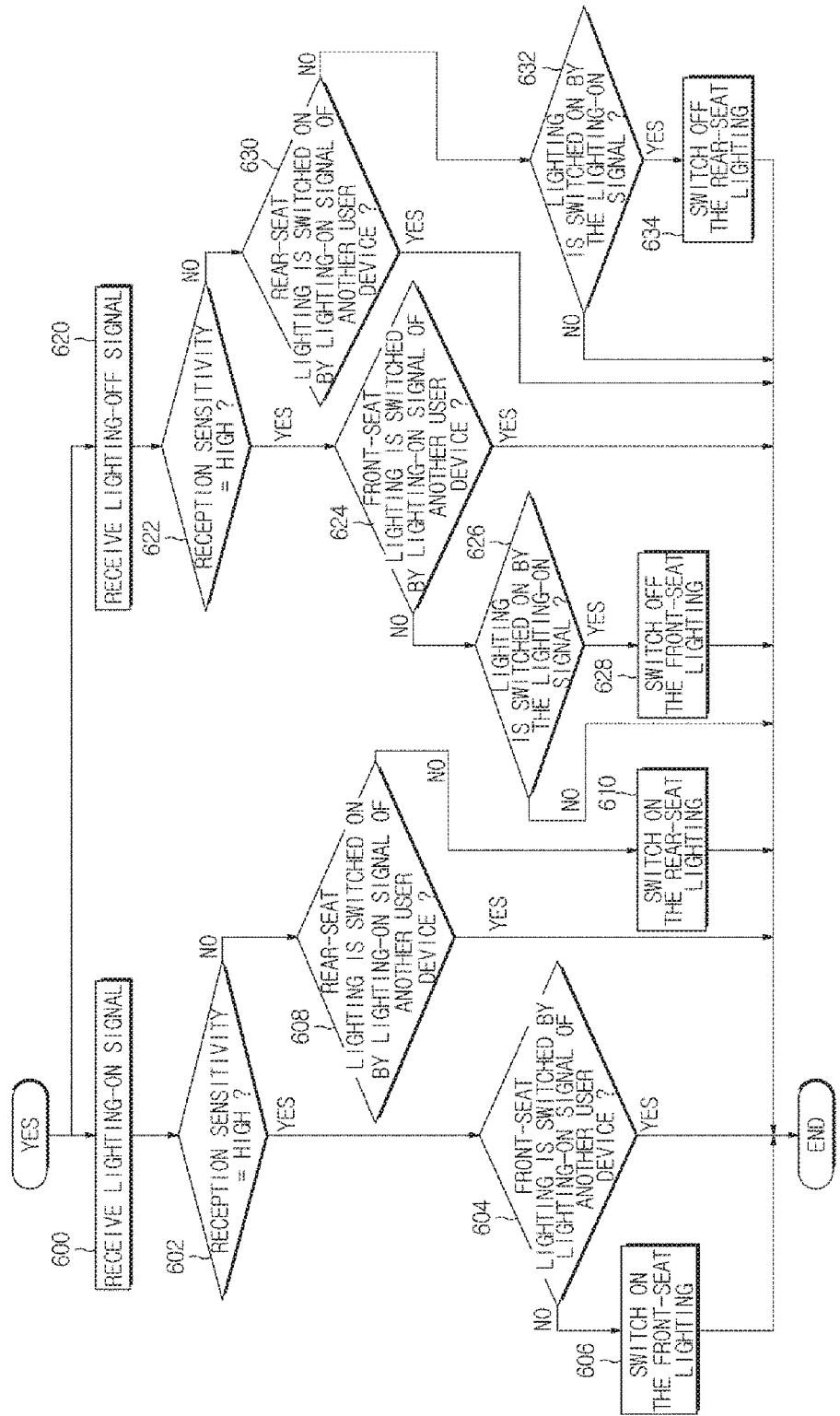
FIG. 5 is a flowchart illustrating an algorithm for controlling the AVN head unit to control lights of the vehicle by interacting with one or more user devices.

FIG. 5 is a flowchart illustrating an algorithm for controlling the AVN head unit to control lights of the vehicle by interacting with one or more user devices according to one form of the present disclosure.

Referring to FIG. 5, upon receiving the lighting-ON signal from the user device 200 (Operation 600), the AVN head unit 100 may determine communication sensitivity of the received lighting-ON signal, and may determine whether the reception sensitivity is equal to or higher than a predetermined reference value (Operation 602).

If the reception sensitivity is strong or high (Operation 602), the AVN head unit 100 may determine that the user device 100 is located at the front seat, and may determine whether the front-seat lighting is switched on by the lighting-ON signal of another user device 200 (Operation 604). In the case where the front-seat lighting is switched by the other user device 200, the front-seat lighting may operate on the condition that the front-seat lighting is switched on by the other user device 200, and the front-seat lighting may operate irrespective of the other user device 200.

If the front-seat lighting is switched on by the lighting-ON signal of the other user device 200 (Operation 604), the AVN head unit 100 may determine that the front-seat lighting has already been switched on by the other user device 200, and may stop operation without controlling the in-vehicle devices (e.g., the front-seat lighting).

Meanwhile, if the front-seat lighting is not switched on by the lighting-ON signal of the other user device 200 (Operation 604), the AVN head unit 100 may switch on the front-seat lighting acting as one of the in-vehicle devices by controlling the front-seat lighting module 410 (Operation 606).

If the reception sensitivity is equal to or less than a predetermined reference value ((Operation 602), the AVN head unit 100 may determine that the user device 100 is located at the rear seat, and may determine that the rear-seat lighting is switched on by the lighting-ON signal of the other user device 200 (Operation 608).

In the case where the rear-seat lighting is switched by the other user device 200, the rear-seat lighting is not operated on the condition that the rear-seat lighting is switched on by the other user device 200, and the rear-seat lighting can operate irrespective of the other user device 200.

If the rear-seat lighting is switched on by the lighting-ON signal of the other user device 200 (Operation 608), the AVN head unit 100 may determine that the rear-seat lighting has already been switched on by the other user device 200, and may stop operation without controlling the in-vehicle device (e.g., the rear-seat lighting).

If the rear-seat lighting is not switched on by the lighting-ON signal of the other user device 200 (Operation 608), the AVN head unit 100 may switch on the rear-seat lighting acting as one of the in-vehicle devices by controlling the rear-seat lighting module 420 (Operation 610).

Subsequently, upon receiving the lighting-OFF signal from the user device 200 (Operation 620), the AVN head unit 100 may determine communication sensitivity of the received lighting-ON signal, and may determine whether the reception sensitivity is equal to or higher than a predetermined reference value (Operation 622).

If the reception sensitivity is strong or high (Operation 622), the AVN head unit 100 may determine that the user device 100 is located at the front seat, and may determine that the front-seat lighting is switched on by the lighting-ON signal of the other user device 200 (Operation 624). In the case where the front-seat lighting is switched by the other user device 200, the front-seat lighting is not operated on the condition that the front-seat lighting is switched on by the other user device 200, and the front-seat lighting can operate irrespective of the other user device 200.

If the front-seat lighting is switched on by the lighting-ON signal of the other user device 200 (Operation 624), the AVN head unit 100 may determine that the front-seat lighting has already been switched on by the other user device 200, and may stop operation without controlling the in-vehicle device (e.g., the front-seat lighting).

If the front-seat lighting is not switched on by the lighting-ON signal of the other user device 200 (Operation 624), the AVN head unit 100 may determine whether the lighting is switched on by the lighting-ON signal (Operation 626). In order to prevent the front-seat lighting from being automatically switched on when the user manually switches on the front-seat lighting during execution of the lighting-ON operation, the AVN head unit 100 may determine whether the front-seat lighting is switched on by the lighting-ON signal.

If the lighting is not switched on by the lighting-ON signal (Operation 626), the AVN head unit 100 may determine that the front-seat lighting is manually switched on by the user, such that the AVN head unit 100 may stop operation without controlling the in-vehicle device (i.e., the front-seat lighting).

If the lighting is switched on by the lighting-ON signal (Operation 626), the AVN head unit 100 may determine that the front-seat lighting is automatically switched on, and may switch off the front-seat lighting by controlling the front-seat lighting module 410 (Operation 628).

If the reception sensitivity is equal to or less than a predetermined reference value (Operation 622), the AVN head unit 100 may determine that the user device 100 is located at the rear seat, and may determine that the rear-seat lighting is switched on by the lighting-ON signal of the user device 200 (Operation 630).

In the case where the rear-seat lighting is switched by the other user device 200, the rear-seat lighting is not operated on the condition that the rear-seat lighting is switched on by the other user device 200, and the rear-seat lighting can operate irrespective of the other user device 200.

If the rear-seat lighting is switched on by the lighting-ON signal of the other user device 200 (Operation 630), the AVN head unit 100 may determine that the rear-seat lighting has already been switched on by the other user device 200, and may stop operation without controlling the in-vehicle device (i.e., the rear-seat lighting).

If the rear-seat lighting is not switched on by the lighting-ON signal of the other user device 200 (Operation 630), the AVN head unit 100 may determine whether the lighting is switched on by the lighting-ON signal (Operation 632). In order to prevent the rear-seat lighting from being automatically switched on when the user manually switches on the rear-seat lighting during execution of the lighting-ON operation, the AVN head unit 100 may determine whether the rear-seat lighting is switched on by the lighting-ON signal.

If the rear-seat lighting is not switched on by the lighting-ON signal (Operation 632), the AVN head unit 100 may determine that the rear-seat lighting is manually switched on by the user, such that the AVN head unit 100 may stop operation without controlling the in-vehicle device (i.e., the rear-seat lighting).

If the rear-seat lighting is switched on by the lighting-ON signal (Operation 632), the AVN head unit 100 may determine that the rear-seat lighting is automatically switched on, and may switch off the rear-seat lighting by controlling the rear-seat lighting module 420 (Operation 634).

As described above, the AVN head unit 100 may receive the lighting-ON/OFF signal of the vehicle from one or more user devices 200, may automatically switch on or off the lighting device of the vehicle 1, and may automatically control the in-vehicle device by interacting with manipulation of one or more user devices 200.

During execution of the weather application in the user device 200, the method for controlling the in-vehicle devices (i.e., windows, sunroof, etc.) using the AVN head unit 100 will hereinafter be described with reference to FIG. 6.

Figure 6:
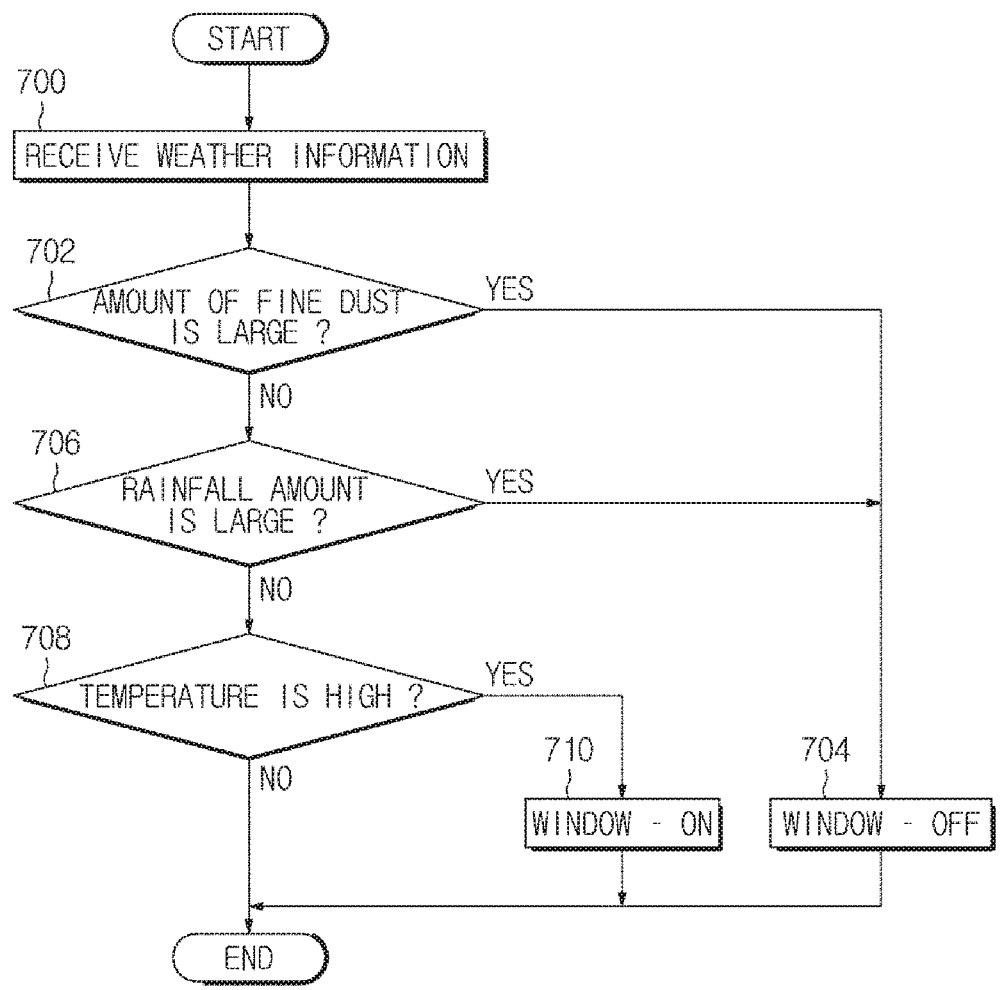
FIG. 6 is a flowchart illustrating an algorithm for controlling the AVN head unit to control in-vehicle devices using weather information acquired from the user device.

FIG. 6 is a flowchart illustrating an algorithm for controlling the AVN head unit to control in-vehicle devices using weather information acquired from the user device according to one form of the present disclosure.

Referring to FIG. 6, the user may perform the weather application using the user device 200.

When the weather application is executed by the user device 200, the device controller 240 may transmit weather information to the AVN head unit 100 of the vehicle 1. In this case, the weather information applied to the AVN head unit 100 may be transferred through short range communication such as Wi-Fi or Bluetooth communication.

Upon receiving the weather information from the user device 200 (Operation 700), the AVN head unit 100 may determine whether or not the amount of fine dust is large (Operation 702). In association with a reference for determining whether or not the amount of fine dust is large, a reference value of fine dust is prestored, and the stored reference value is compared with a numerical value (received from the user device 200) indicating the amount of fine dust, such that the final reference may be decided.

If the amount of fine dust is large (Operation 702), the AVN head unit 100 may switch off the window 17 by controlling the window module 440 (Operation 704). In this case, the operation for switching off the window 17 may be decided by closing the window 17. If the sunroof 24 is opened when the window 17 is switched off, the sunroof 24 may also be closed.

If the amount of fine dust is not large (Operation 702), the AVN head unit 100 may determine whether the amount of rainfall is large (Operation 706). In association with a reference for determining whether the amount of rainfall is large, a reference amount of rainfall is prestored, and the stored reference amount of rainfall is compared with a numerical value (received from the user device 200) indicating the reference amount of rainfall, such that the final reference amount of rainfall may be decided.

If the amount of rainfall is large (Operation 706), the AVN head unit 100 may expect that rain will fall and may switch off the window 17 (Operation 704). If the sunroof 24 is opened when the window 17 is switched off, the sunroof 24 may also be closed.

If the amount of rainfall is not large (Operation 706), the AVN head unit 100 may determine whether a temperature is high (Operation 708). In association with a reference for determining whether the temperature is high, a reference temperature is prestored, and the stored reference temperature is compared with a temperature received from the user device 200, such that the final reference temperature may be decided.

If the temperature is high (Operation 708), the AVN head unit 100 may determine that a temperature of the indoor space of the vehicle 1 is high, and may switch on the window 17 by controlling the window module 440 (Operation 710). Here, the operation for switching on the window 17 may indicate that the window 17 is opened. If the sunroof 24 is closed when the window 17 is switched on, the sunroof 24 may be opened.

If a temperature of the indoor space of the vehicle 1 is not high (Operation 708), the AVN head unit 100 may receive various kinds of information from the user device 200, and may control other devices (e.g., the air conditioner) contained in the vehicle 1.

As described above, the AVN head unit 100 may receive weather information from the user device 200 to automatically switch on or off the window 17 or the sunroof 24 of the vehicle 1, such that the devices contained in the vehicle 1 can be automatically controlled according to manipulation of the user device 200.

As is apparent from the above description, the head unit, the vehicle including the same, and the method for controlling the vehicle equipped with the head unit according to some forms of the present disclosure can automatically control in-vehicle devices by interacting with the external device paired with the vehicle. For example, if illuminance of the indoor space of the vehicle is dark when the iris recognition or camera function is executed by the external device, the in-vehicle light may be automatically lightened. If it is expected that rain will fall or a large amount of fine dust occurs when the weather application is executed by the external device, the window or sunroof of the vehicle according to some forms of the present disclosure is automatically closed, resulting in increased user convenience.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A head unit comprising:
a controller configured to control an in-vehicle device contained in a vehicle by interacting with manipulation of a user device,
wherein the controller is configured to:
receive information from the user device;
control the in-vehicle device based on the information;
perform a command for operating the in-vehicle device based on signal sensitivity of the information and a predetermined logic;
determine a position of the user device based on the signal sensitivity of the information;
receive a lighting-ON signal from the user device;
determine the position of the user device based on communication sensitivity of the lighting-ON signal; and
determine that the user device is located at a front seat when the communication sensitivity of the lighting-ON signal is equal to or higher than a predetermined reference value.

2. The head unit according to claim 1, wherein:
when the communication sensitivity of the lighting-ON signal is equal to or less than the predetermined reference value, the controller is configured to determine that the user device is located at a rear seat.

3. The head unit according to claim 2, wherein the controller is configured to control a front-seat lighting or a rear-seat lighting based on the position of the user device.

4. The head unit according to claim 3, wherein:
when receiving a lighting-OFF signal from the user device, the controller is configured to determine a result whether a lighting is turned on by the lighting-ON signal, and to control a lighting-OFF operation based on the result.

5. The head unit according to claim 1, wherein:
when a plurality of the user devices is present, the controller is configured to determine whether the lighting is turned on by another user device regardless of whether the lighting-ON signal is received from any user device of the plurality of the user devices, and to control operation of the lighting.

6. The head unit according to claim 5, wherein:
only when the lighting is not turned on by another user device, the controller is configured to:
determine the communication sensitivity of the lighting-ON signal;
determine the position of any of the plurality of the user devices; and
control operation of the lighting based on the position of any of the plurality of the user devices.

7. The head unit according to claim 1, wherein the controller is configured to receive weather information from the user device and to control the in-vehicle device based on the weather information.

8. A method for controlling a vehicle using a head unit connected to a plurality of user devices, where the head unit is configured to control an in-vehicle device contained in the vehicle, the method comprising:
receiving a lighting-ON signal from any of the plurality of the user devices;
determining whether the lighting is turned on by any of the plurality of the user devices;
when it is determined that the lighting is not turned on by any of the plurality of the user devices, controlling alighting-ON operation based on the lighting-ON signal;
receiving a lighting-OFF signal from any of the plurality of the user devices;
determining whether the lighting is turned on by any of the plurality of the user devices;
when it is determined that the lighting is not turned on by any user device of the plurality of the user devices, determining whether the lighting is turned on by the lighting-ON signal; and
when it is determined that the lighting is turned on by the lighting-ON signal, controlling alighting-OFF operation.

9. The method according to claim 8, further comprising:
determining a position of the any user device of the plurality of the user devices based on communication sensitivity of the lighting-ON or lighting-OFF signal; and
controlling the lighting-ON or lighting-OFF operation based on the position of the any user device of the plurality of the user devices.

* * * * *